United States Patent [19]

Berkowitz

[11] 4,076,429
[45] Feb. 28, 1978

[54] CONVERTIBLE TUBE CONNECTING SYSTEM

[75] Inventor: Irving L. Berkowitz, Binghamton, N.Y.

[73] Assignee: Kason Hardware Corporation, Binghamton, N.Y.

[21] Appl. No.: 717,873

[22] Filed: Aug. 26, 1976

Related U.S. Application Data

[63] Continuation-in-part of Ser. No. 628,584, Nov. 4, 1975, Pat. No. 4,023,913.

[51] Int. Cl.² ............................................. F16B 7/00
[52] U.S. Cl. .......................................... 403/2; 403/3; 403/172; 403/298
[58] Field of Search ............... 403/2, 3, 171, 172, 403/176, 298, 295, 292

[56] References Cited

U.S. PATENT DOCUMENTS

| | | | |
|---|---|---|---|
| 3,155,405 | 11/1964 | Cadovius | 403/327 X |
| 3,255,721 | 6/1966 | Peterschmidt | 403/172 X |
| 3,532,369 | 10/1970 | Reilly | 403/176 |
| 3,645,569 | 2/1972 | Reilly | 403/295 X |
| 3,648,404 | 3/1972 | Ogsbury | 403/176 |
| 3,858,989 | 1/1975 | Field | 403/171 |

*Primary Examiner*—Andrew V. Kundrat
*Attorney, Agent, or Firm*—Paul J. Sutton

[57] ABSTRACT

The present invention provides a convertible connector for coupling a plurality of elongated members having open or socket-like ends which may be either circular or polygonal in transverse, internal cross section. In a preferred embodiment of this invention, the connector includes a base portion from which at least two integrally formed legs extend. The end of each leg adjacent the base is of a transverse cross section that may receive a member having either a circular or a polygonally shaped transverse, internal cross section. The end portion of each leg spaced from the base portion has a polygonal transverse cross section that is integral to the remainder of each leg by means of a severable or frangible neck. Thus, when members having a circular open or socket-like end are to be mounted on the connector, the polygonal ends of the legs are broken off. In cases when members having polygonal, socket-like ends are to be mounted on the connector, the polygonal ends of the legs remain and the members to be mounted slide thereover and over substantially all of the remaining portion of leg as well.

5 Claims, 13 Drawing Figures

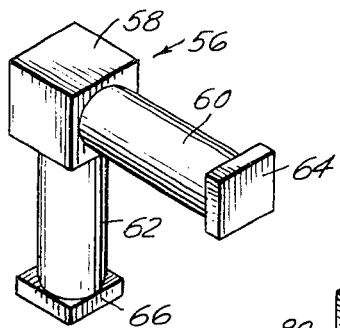
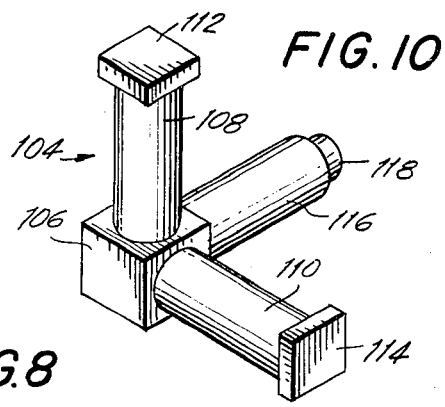
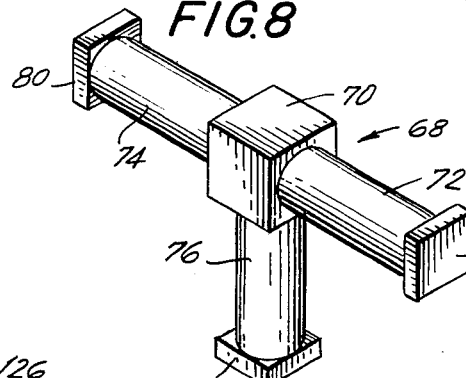
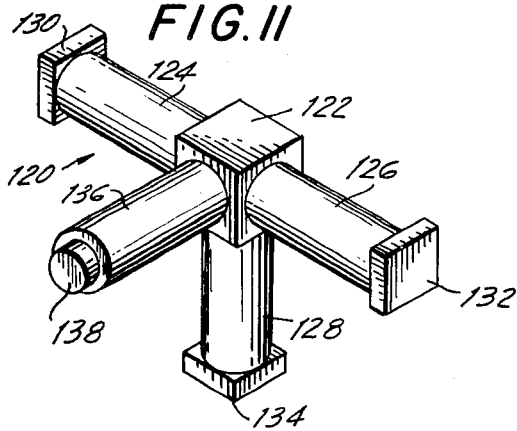
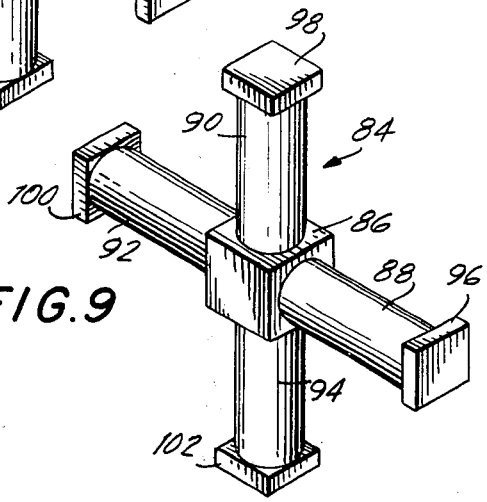
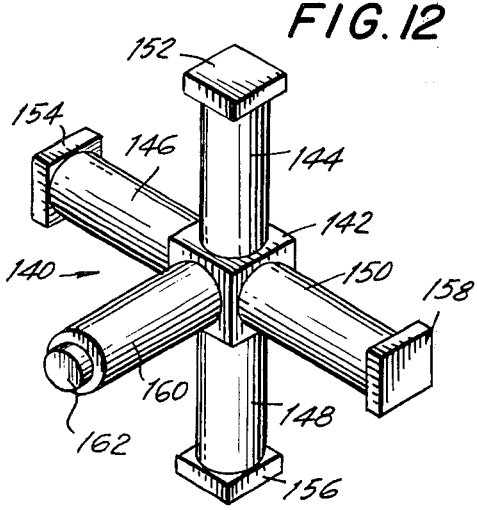
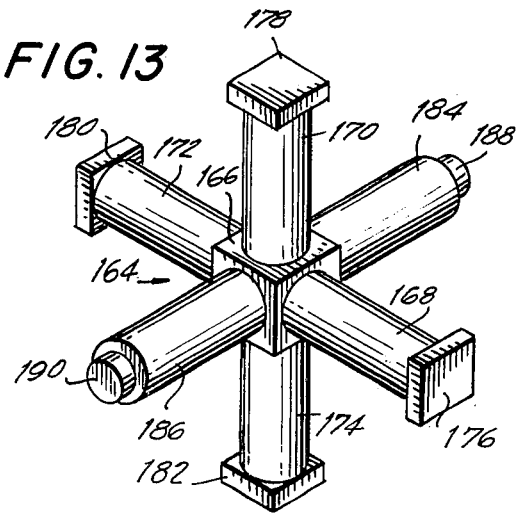

CONVERTIBLE TUBE CONNECTING SYSTEM

This is a continuation-in-part application of my copending U.S. patent application Ser. No. 628,584 filed Nov. 4, 1975 and now U.S. Pat. No. 4,023,913.

The present invention relates generally to the connector arts, and more particularly to an improved, low cost connector that may be used when assembling tubular members to each other such as in display structures, frames, furniture, shelving and the like.

There are many examples of connectors of various types in the prior patent literature in the field to which the present invention is generally directed. One such example of the prior art is disclosed in U.S. Pat. No. 3,255,721 granted on June 14, 1966 to P.L. Peterschmidt. This patent illustrates a joint member having a central support portion from which a plurality of square-shaped roots extend. From each of the roots there extends a tapered portion that terminates in a substantially square head. In its assembled condition, this tubular member is supported on the head and the central portion of the connector. However, the only type tubular member that can be joined by the connector in the Peterschmidt patent is one that has precisely the same transverse cross section as the outwardly extending portions of the connector. That is, a tubular member having either a square or rectangular cross section. As will be explained more fully hereinbelow, the present invention teaches the concept of a convertible connector that is substantially more versatile and, by very simple means permits the coupling of tubular members having open or socket-like ends that are of differing cross sectional configurations, such as circular or polygonal in transverse cross section.

Another example of the known connector are in the field to which the present invention is directed is disclosed in U.S. Pat. No. 3,645,569 granted on Feb. 29, 1972 to F.W. Reilly. In the Reilly patent a central, preferably cubical body having three spigots or arms projecting outwardly from three of the faces of the body is disclosed. The spigots are adapted to support a tubular, resiliently compressible sleeve on which a square, tubular member may be mounted. The compressible sleeve serves as an insert for use in forming a releasable lock-type joint between the hollow, rectangular tubular member and the cubical connector. The present invention not only performs all of the functions that are inherent in the structure disclosed by Reilly but also permits the assembly of tubular members having different transverse, internal cross sections at least at the ends thereof.

U.S. Pat. No. 3,858,989 granted on Jan. 7, 1975 to F.P. Field discloses a joint for connecting structural members to each other. In the embodiment illustrated in the Field patent, the joint is comprised of a generally prismatic hub having faces on which three projections are mounted. One of the projections is tubular and circular in internal, transverse cross sections, while the remaining two projections are generally X-shaped in transverse cross section. While a tubular member having a circular transverse cross section can be mounted on the first or circular projection and tubular members having square transverse internal cross sections can be mounted on the remaining two projections, it should be obvious from reading this patent that none of the three projections disclosed in the Reilly patent can accommodate, selectively, tubular members having both circular and polygonal in transverse, internal cross section.

Another U.S. Pat. No. 3,532,369 granted to F.W. Reilly discloses a connector for joining square or substantially square tubes by means of a plurality of posts that are integral with a central block. The posts are insertible into the tubes and carry projections or enlargements which are resiliently compressible. In this last-mentioned Reilly patent, the overall diameter of each post is less than the diameter across the diagonal dimension of the tube and slightly greater than the side dimension across the short diameters of the tubular member into which it is to fit. Connection is made by orienting the projections with the angles of the tubular member, inserting the post and then, by axial rotation, an interference fit is obtained which releasably locks the post in the tubular member. The present invention distinguishes over the last-mentioned Reilly patent in that compressible members are not required and yet, any post or leg of the plurality of posts or legs in the connector comprising the present invention can accommodate a tubular member having either a circular or a polygonal transverse, internal cross section, for example.

U.S. Pat. No. 3,648,404, granted on Mar. 14, 1972, in the name of Ogsbury et al., discloses a connector unit for a toy building set, wherein the connector unit has a plurality of relatively angularly disposed connector arms radiating from a common center. Each arm has a generally cylindrical or spherical male connector portion which serves as releasable connecting means for press fitting insertion through openings in sheets of selected shapes and tubes of selected lengths. The tubes are constructed to expand when fitted over the spherical male portions to provide a tenacious grip with a substantial degree of angular movement therebetween. Shoulder portions on the connector arms may be provided to limit the extent of movement on the sheets and tubes along the connector arms for square corners and resulting structures which conform to a selected scale. It will be appreciated that while the spherical end portions of the connector arms in the Ogsbury et al. patent can accommodate tubular members having either circular or polygonal transverse, internal cross sections, there will be a minimum of support for the tubular members because of the spherical shape of the ends of the connector arms. By way of contrast, the present invention provides for either a plurality of axially elongated bearing surfaces or axially spaced-apart bearing surfaces in combination with a plurality of axially elongated bearing surfaces.

U.S. Pat. Nos. 3,211,481 and 3,155,405 granted on Oct. 12, 1965 and Nov. 3, 1964, respectively to P. Cadovius disclose a structure that is functionally only somewhat similar to the structure described hereinabove with regard to the Ogsbury et al. patent. That is, in the Cadovius patents there is disclosed axially spaced apart means on arms that project from a central hub for supporting tubular members. It will be evident when comparing the present invention to either of the two patents granted to Cadovius that different structural forms are involved. In the present invention a die cast member is disclosed which, in one form, can support tubular members having polygonal, transverse, internal cross sections. When a tubular member having a circular transverse internal cross section is to be supported, the end of the leg portion in the present invention is broken off and the tubular member is supported on the remaining portion of the arms. By way of contrast, the structure disclosed by Cadovius in both the aforementioned patents does not suggest the possibility of "converting" the arms for use with two different types of tubular members, as contemplated by the present invention.

The present invention contemplates the elimination of most all of the limitations and disadvantages of conventional solutions to recognized needs of the art, by providing novel structure. Accordingly, it is an object of the present invention to provide an improved connector joint or joining element for at least two members having open or socket-like ends.

It is another object of the present invention to provide an improved connector joint, as described above, that may be fabricated by a casting method.

A further object of the present invention is to provide an improved connector joint, as described above, that does not require any subsequent machining or fabrication after the casting thereof.

Yet another object of the present invention is to provide an improved connector joint, as described above, that may be utilized without special tools or skills.

A further object of the present invention is to provide an improved connector joint, as described above, that is relatively inexpensive to fabricate.

A further object of the present invention is to provide an improved connector joint, as described above, that may be readily converted for use with members having open or socket-like ends wherein the inside diameters of either one or both of the tubular members have either a circular or polygonal transverse internal cross section, or any other differing cross sections.

Still another object of the present invention is to provide an improved connector joint, as described above, that may accommodate at least two and as many as six or more elongated members having socket-like ends.

The present invention fulfills the aforementioned objects and overcome limitations and disadvantages of prior art solutions to problems by providing, according to one aspect of the present invention, a novel system made up of novel components for connecting elongated members having open or socket-like ends. In one embodiment of the invention a base portion is provided from which at least first and second elongated legs extend and which, in turn, are cast integrally with the base portion. These legs are positioned in a common plane with the longitudinal axes of the legs being substantially though not necessarily perpendicular to each other. Each of the legs comprises an elongated body portion immediately adjacent the base portion with the body portion having a transverse cross section that will receive a tubular member that is either circular or polygonal in transverse cross section. A frangible neck portion is formed integrally with and extends from the end of the body portion that is remote from the base portion. A head portion is formed integrally with the neck portion and is provided with a polygonal transverse cross section for receiving a tubular member having a polygonal transverse, internal cross section. The head portion may be severed or broken off of the neck portion so that a tubular member having a circular transverse, internal cross section may be supported on the body portion. The system comprising the present invention provides a number of different connector joints each having a plurality of legs, ranging from two legs to six legs. Each of the legs in the present invention is provided with at least two and preferably four longitudinally oriented ribs that extend in radially opposite directions with respect to the axis of the legs. In addition, each of the legs is provided with stop means in the form of radially oriented shoulders in order to limit the movement of the tubular members thereon in a direction towards the base portion.

The invention will be more clearly understood from the following description of specific embodiments of the invention, together with the accompanying drawings, wherein similar reference characters denote similar elements throughout the several views and in which:

FIG. 7 is a schematic, perspective view illustrating one variety of connector comprising the present invention;

FIG. 8 is a schematic perspective view illustrating a modification of the connector shown in FIG. 7;

FIG. 9 is a schematic, perspective view illustrating another modification of the connector shown in FIG. 7;

FIG. 10 is a schematic, perspective view illustrating another variety of the connector comprising the present invention;

FIG. 11 is a schematic, perspective view illustrating a modification of the connector shown in FIG. 10;

FIG. 12 is a schematic, perspective view illustrating another modification of the connector shown in FIG. 10; and FIG. 13 is a schematic, perspective view illustrating still another modification of the connector shown in FIG. 10.

Figure 1:
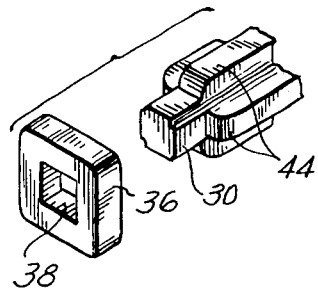
FIG. 1 is an exploded perspective view of one embodiment of the present invention.
Figure 2:
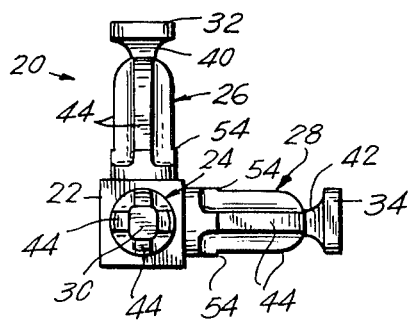
FIG. 2 is a top plan view of the connector shown in FIG. 1 with a component thereof removed for clarity.

Referring now to the drawing, and in particular to FIGS. 1 – 6, there is shown a typical connector 20 comprising the present invention. As mentioned hereinabove, the connector 20 may be made by a die casting process from any suitable material, such as what is commercially known as Zamak No. 3, for example. The connector 20 comprises a base portion 22 which has three legs, 24, 26 and 28 formed integrally therewith and extending outwardly from the base portion 22. For purposes to be described hereinafter, the outermost extremity of the leg 24 is formed as a pin 30. The outermost extremities of the legs 26 and 28 have a head 32 and 34, respectively, formed thereon.

Figure 3:
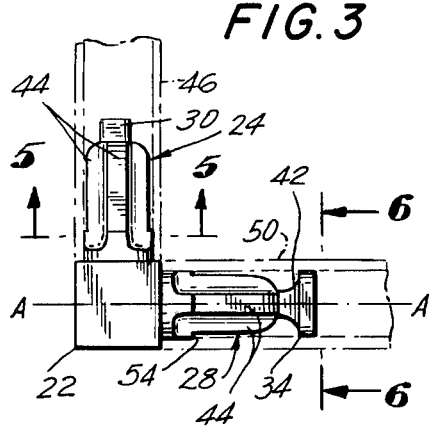
FIG. 3 is a front elevational view of the connector shown in FIG. 2.
Figure 4:
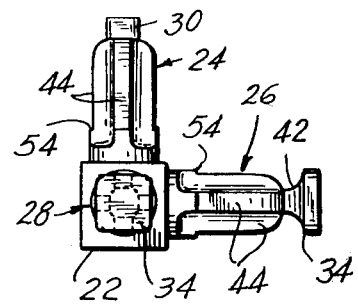
FIG. 4 is a side elevational view of the connector shown in FIG. 3.

The pin 30 is formed at the end of the leg 24 in order to facilitate the die casting process. That is, assuming that the parting line is along line A—A as shown in FIG. 3, the die sections can be taken apart and the connector removed only if the leg 24 does not have a head such as either 32 or 34. Once the connector 20 is cast, a slug 36 may be mounted on the pin 30 in order to simulate structure such as shown by the heads 32 and 34. It will be noted in FIG. 1 in particular that the pin 30 has a substantially rectangular or square cross section and a mating square hole 38 is formed in the slug 36 so as to prevent relative rotation between the slug 36 and the leg 24. Other cross sectional configurations for all parts are contemplated.

Intermediate the body portion of each leg 26 and 28 and its respective head portion 32 and 34, there is formed a neck portion 40 and 42, respectively, each of which is frangible at the juncture thereof with its respective leg 26 or 28. In addition, each of the legs 24, 26 and 28 is provided with a plurality of longitudinally oriented rubs 44 that extend in a radial direction with respect to the longitudinal axis of each leg. These ribs serve to provide strength while eliminating the need for material therebetween as a result of the increase in cross-sectional moment of inertia.

Figure 5:
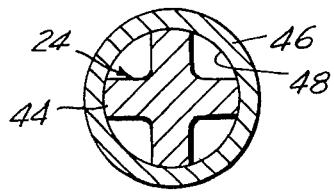
FIG. 5 is a transverse sectional view taken along line 5 — 5 of FIG. 3.
Figure 6:
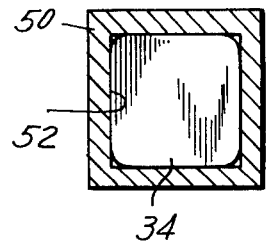
FIG. 6 is a transverse sectional view taken along line 6 — 6 of FIG. 3.

It will be appreciated that when a tubular member 46 having a circular transverse, internal cross section 48 such as shown in FIG. 5 is mounted on the leg 24 the axially elongated portions defining ribs 44 will provide a plurality of axially elongated bearing surfaces. It will also be appreciated that when a tubular member 50 having a polygonal transverse internal cross section 52, such as is shown in FIG. 6, is mounted on either of the legs 26 or 28, the ribs 44 will once again provide a plurality of elongated bearing surfaces and, in combination with the head portions 32 and 34, will also provide axially spaced-apart bearing surfaces for member's mounting over the respective leg.

The reader will note in passing that, while four ribs 44 have been illustrated, the present invention is not limited to the specific number and the ribs may not be necessary for this invention to function according to its intended purposes. There should be at least two ribs 44 but there may be three or more angularly spaced apart ribs 44 as well. Four ribs 44 have been shown for purposes of illustration only. It should be further noted that while the heads 32 and 34 have been shown with a square cross section, other polygonal shapes such as an hexagonal cross section will function with equal facility.

In order to limit the movement of the tubular members that are mounted on the connector, a plurality of radially oriented shoulders 54 are provided for example to a height of approximately 0.009 inches. When the tubular members either 46 or 50 slide on any one of the legs 24, 26 or 28, they move towards the base portion 22 until they abut the shoulders 54, whereupon further movement of the respective tubular member toward the base portion finally results in the tubular member's reaching and abutting the surfaces of base portion 22 facing the respective leg accepting or receiving the tubular member. These same surfaces of base portion 22 limit the movement of the tubular member during its insertion over the leg in question (see FIG. 3 which illustrates this) and, of course, are integral with the leg. Thus, as shown in FIG. 3, a substantially closed joint will be formed and the connector 20 will be almost completely concealed.

To further amplify what should also be clear from the drawings, and more particularly FIG. 3, the portion of legs 24, 26 and 28, for example, which is reduced by the said 0.009 inches to form the outer diameter of the legs' respective ribs, facilitates relatively easy and unobstructed or uninhibited mounting of a tubular member over each leg. Once shoulders 54 are reached, the tubular members are forced into the positions shown in phantom in FIG. 3. Note that in the fully mounted position shown in FIG. 3, tubular member 50 is engaged at its inner surfaces by the outer surfaces of both head 34 and the portions of leg 28 adjacent base portion 22, thereby providing spaced support and resistance to lateral movement. In the case of a leg 28 of circular cross-section, tube 50 will be engaged at substantially four portions of this leg next to base portion 22.

FIG. 7 illustrates a connector 56 having a base portion 58 and only two legs 60 and 62, together with head portions 64 and 66, respectively. The legs 60 and 62 are in a common plane, and, should it be desired to support tubular members having circular transverse internal cross sections on the connector 56 the heads 64 and 66 would be removed. Otherwise, with the heads 64 and 66 remaining, tubular members having polygonal, transverse internal cross sections may be supported on the legs 60 and 62.

FIG. 8 illustrates a modification of the connector 56 shown in FIG. 7. The connector 68 in FIG. 8 is comprised of a base portion 70 from which projects three legs 72, 74 and 76, having head portions 78, 80 and 82, respectively. As with the embodiment shown in FIG. 7, the connector 68 may have the head portions 78, 80 and 82 cast integrally since the arms 72, 74 and 76 are all in a common plane. Should it be desired to mount a tubular member having a circular transverse internal cross section on any of the arms in the modification shown in FIG. 8, then the head portion of that arm would have to be severed or removed in a manner described hereinbefore in connection with the embodiment shown in FIG. 1.

Still another modification of the present invention is shown in FIG. 9. Connector 84 is provided with a base portion 86 from which projects four legs 88, 90, 92 and 94, having head portions 96, 98, 100 and 102 formed integrally therewith. As shown in FIG. 9, the arms 88, 90, 92 and 94 are all in a common plane so that the head portions 96, 98, 100 and 102 may be formed during the casting operation. As noted hereinbefore, should it be desired to secure a tubular member having a circular transverse internal cross section on any of the legs shown in FIG. 9 then the head portion on that leg would have to be removed in a manner described in connection with the embodiment of FIG. 1.

A variation of the present invention is illustrated in FIG. 10. Connector 104 is provided with a base portion 106 from which projects, in a common plane, legs 108 and 110 having head portions 112 and 114 formed respectively thereon. Since the legs 108 and 110 are in a common plane, the head portions 112 and 114 may be cast integrally therewith. A third leg 116 is also provided that is in a second plane which is perpendicular to the plane of the legs 108 and 110. Because a die casting operation is used in the fabrication of the connector 104 it is necessary to provide a pine 118 at the end of the leg 116 in order to receive a slug of the type such as shown by the reference character 36 in FIG. 1. Where a tubular member having a circular transverse internal cross section is mounted on either of the legs 108 or 110 the head formed integrally therewith would have to be removed in the manner described in connection with FIG. 1. However, since there is no head formed on the leg 116, a tubular member having a circular transverse internal cross section could be mounted directly thereon. Should it be desired to mount a tubular member having a polygonal transverse internal cross section on the leg 116 then a slug of the type designated by the reference character 36 in FIG. 1 would have to be mounted on the pin 118 with the slug having the same polygonal transverse cross section as the tubular member.

Turning now to FIG. 11, there is shown a connector 120 having a base portion 122 from which project three legs 124, 126 and 128, all in a common plane. The legs 124, 126 and 128 are provided with integrally cast head portions 130, 132 and 134, respectively. A fourth leg 136 is also integrally cast with the connector 120 but in a plane that is perpendicular to the plane of the legs 124, 126 and 128. Accordingly, in order to facilitate the die casting operation, a pin 138 is cast on the outer end of the leg 136 instead of a head portion. By the use of a slug, such as the type designated by the reference character 36 in FIG. 1, either of the two tubular members having a circular or polygonal transverse internal cross section may be mounted on the leg 136. As illustrated, only a tubular member having a polygonal transverse internal cross section can be mounted on any of the legs 124, 126 or 128. However, should it be desired to mount a tubular member having a circular transverse internal cross section on any of these legs then the head portion integral therewith would have to be removed in a manner described in connection with the embodiment of FIG. 1.

The connector 140 shown in FIG. 12 is essentially the same as that shown in FIG. 11 except that there is an additional leg provided. A base portion 142 is provided having legs 144, 146, 148 and 150 extending therefrom in a common plane. Head portions 152, 154, 156 and 158 are formed integrally with the legs 144, 146, 148 and 150 respectively. The head portions 152, 154, 156 and 158 may be left intact if a tubular member having a polygonal transverse internal cross section is mounted thereon. However, should it be desired to mount a tubular member having a circular transverse internal cross section on any of the first four mentioned legs 144, 146, 148, or 150, then the head portion associated therewith would have to be removed in the manner described in connection with the embodiment shown in FIG. 1. In addition, a fifth leg 160 is provided which is positioned in a plane perpendicular to the single, common plane of the legs 144, 146, 148 and 150. To facilitate the casting process, the leg 160 is provided with a coaxial pin 162 and, as such, can accommodate a tubular member having a circular transverse internal cross section, then a slug such as the type designated by the reference character 36 in FIG. 1 is mounted on the pin 162.

Connector 164 shown in FIG. 13 can accommodate six tubular members. The connector 164 is provided with a base portion 166 from which extends, in a single, common plane, four legs 168, 170, 172 and 174 having, at their outer ends, head portions 176, 178, 180 and 182. Any of the head portions can be removed in the manner described in connection with the embodiment of FIG. 1 should it be desired to mount a tubular member having a circular transverse internal cross section. However, should it be desired to mount a tubular member having a polygonal transverse internal cross section then the head portions 176, 178, 180 and 182 are left intact. In addition, two other legs 184 and 186 are also cast integrally with the connector 164 but in a single, common plane that is perpendicular to the plane that is common to the legs 168, 170, 172 and 174. Because the legs 184 and 186 are in a perpendicular plane, pins 188 and 190, respectively, are cast integrally therewith without head portions. Tubular members having circular transverse internal cross sections may be mounted on the legs 184 and 186 without alteration thereof. However, should it be desired to mount tubular members having polygonal transverse internal cross sections on either of the legs 184 or 186 then a slug such as designated by the reference character 36 in FIG. 1 would be mounted on either or both of the pins 188 and 190.

From the foregoing it will be evident that an improved, low cost connector for tubular members has been provided. The connector may be made by well known die casting techniques from any suitable material. The connector comprising the present invention is convertible in that, for any specific leg, a tubular member having either a circular or a polygonal transverse internal cross section may be mounted thereon. Where the legs of the connector are in a single, common plane, the head portion is formed integrally with the leg and with an intermediate neck portion. The head portion may be readily snapped off or machined off if desired together with the neck portion approximately at the point where the neck portion joins the leg portion. Where the legs are in a second plane that is perpendicular to the first plane, then no head portion is formed thereon but instead a pin is cast integrally with the leg in order to receive a slug that will be used when a tubular member having a polygonal transverse internal cross section is mounted thereon. When the tube to be mounted has a circular transverse internal cross section then no slug is required. It will be appreciated that the connector comprising the present invention may be fabricated at a relatively low cost and may be used without any special tools or skills.

The embodiments of the invention particularly disclosed here are presented merely as examples of the invention. Other embodiments, forms, and modifications of the invention coming within the proper scope of the appended claims will, of course, readily suggest themselves to those skilled in the art. It must also be yet further emphasized here that any construction of the claims and drawings of the present specification must keep in mind that FIGS. 7 through 13, inclusive, illustrate respective legs which have been schematically shown in full lines, without the details of the legs illustrated in FIGS. 1-6. In fact, each of the legs of the embodiments of the present invention shown in FIGS. 7-13 include legs having the identical structural configuration as each of the legs of the embodiments of FIGS. 1-6. The purpose of presenting said schematic representation of the legs is merely to minimize drafting costs associated with rendering the complete details.

What is claimed is:

1. A convertible connector specifically designed to enable a desired separation and discarding of a portion thereof to facilitate its use with two or more members formed with connector-receiving cavities of two or more configurations, comprising, in combination: a body portion having at least two leg portions integral therewith, each of said leg portions extending from a body hub portion along a leg axis, the axes of said leg portions extending at an angle with respect to each other, each said leg portion including a first contact portion spaced from said body hub portion and a second contact portion proximate said body hub portion and spaced from said first contact portion, said first and second contact portions serving to be received by and to physically contact inner surfaces of members having connector-receiving cavities, the cross-sectional configurations of said first and second contact portions which are transverse with respect to said leg axes being substantially non-identical, the presence of said first contact portion enabling entry and retention of said leg portion within a first connector-receiving cavity of a first configuration whereby first said first contact portion and thereafter both of said first and second contact portions engage said inner surfaces, the absence of said first contact portion due to said separation further enabling entry and retention of its respective leg portion within a second connector-receiving cavity that will not cooperatively accept said first contact portion and whose inner surfaces are engaged by said second contact portion, and localized frangible means disposed substantially at the juncture of said first and second contact portions for facilitating desired physical separation of said first contact portion from the rest of its respective said leg portion at predetermined points spaced from said body portion, said frangible means comprising a frangible neck portion of said leg portion spaced from said body hub portion.

2. A connector according to claim 1 for use with both a first class of members formed with connector-receiving cavities of a configuration having a plurality of substantially straight sides, and a second class of members formed with connector-receiving cavities of a substantially curved configuration.

3. A connector according to claim 1, wherein said neck portion comprises a connector leg portion having predetermined physical failure properties upon application of severing forces of predetermined minimum magnitudes.

4. A connector according to claim 1, wherein said body portion further comprises integral stop means for limiting sliding movement of the members thereon in the direction towards said body hub portion.

5. A convertible connector for connecting two members having socket-like ends or the like, and wherein either one or both of which members has either a substantially circular or non-circular transverse internal cross section, said connector comprising:

a. a base hub portion; and b. at least first and second elongated legs integral with and extending outwardly from said base hub portion, the longitudinal axes of said legs extending at an angle with respect to each other, said legs comprising:

1. an elongated leg body portion immediately adjacent said base hub portion, said leg body portion having a transverse cross section that is adapted to receive a member with an open end having either a substantially circular or a non-circular internal cross section;

2. a frangible neck portion integral with and extending towards the end of said leg body portion and is spaced from said base portion; and 3. a head portion integral with said neck portion, said head portion having a polygonal transverse cross that is adapted to receive a member with an open end having a substantially non-circular transverse internal cross section and said frangible neck portion being disposed substantially at the juncture of said head portion and said elongated leg body portion, said head portion being removable by severing said neck portion whereby only thereafter a member with an open end having a substantially circular transverse in-ernal cross section may be mounted on said leg body portion, and wherein each said leg body portion includes at least two longitudinally oriented rib portions that extend in substantially radial directions with respect to the axis of said leg;

4. said base hub portion comprising stop means for limiting sliding movement of said members thereon in the direction towards said base hub portion.

* * * * *